US011002325B2

(12) United States Patent
Howard et al.

(10) Patent No.: US 11,002,325 B2
(45) Date of Patent: May 11, 2021

(54) BRAKE CALIPER

(71) Applicant: Meritor Heavy Vehicle Braking Systems (UK) Limited, Gwent (GB)

(72) Inventors: Alex Howard, Gwent (GB); Mark Burnard, Gwent (GB); Gordon Onions, Gwent (GB); Phil Smith, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 259 days.

(21) Appl. No.: 16/218,994

(22) Filed: Dec. 13, 2018

(65) Prior Publication Data

US 2019/0186566 A1 Jun. 20, 2019

(30) Foreign Application Priority Data

Dec. 15, 2017 (EP) .................................. 17207580

(51) Int. Cl.
| | |
|---|---|
| *F16D 65/00* | (2006.01) |
| *F16D 55/2265* | (2006.01) |
| *F16D 65/095* | (2006.01) |
| *F16D 55/226* | (2006.01) |
| *F16D 55/00* | (2006.01) |

(52) U.S. Cl.
CPC ....... *F16D 65/0068* (2013.01); *F16D 55/226* (2013.01); *F16D 55/2265* (2013.01); *F16D 65/095* (2013.01); *F16D 2055/0016* (2013.01); *F16D 2250/0084* (2013.01)

(58) Field of Classification Search
CPC .............. F16D 65/0068; F16D 55/226; F16D 55/2265; F16D 65/095; F16D 2055/0016; F16D 2250/0084
See application file for complete search history.

(56) References Cited

U.S. PATENT DOCUMENTS

| | | | |
|---|---|---|---|
| 4,749,066 A * | 6/1988 | Garrett .................. | F16D 55/226 188/73.32 |
| 2010/0320038 A1* | 12/2010 | Hayashi ................ | F16D 55/228 188/72.4 |
| 2018/0195564 A1* | 7/2018 | Yoshikawa ........... | F16D 55/227 |
| 2019/0063534 A1* | 2/2019 | Gibbens ................ | F16D 55/226 |

FOREIGN PATENT DOCUMENTS

| | | |
|---|---|---|
| DE | 102010043898 A1 | 12/2011 |
| EP | 1462671 A1 | 9/2004 |
| EP | 1944522 A1 | 7/2008 |
| EP | 2913551 A1 | 9/2015 |
| GB | 1387833 A | 3/1975 |
| WO | 2010/012486 A1 | 2/2010 |
| WO | WO-2014065400 A1 * | 5/2014 ........... F16D 55/227 |

OTHER PUBLICATIONS

European Patent Office, Extended European Search Report for related Application No. 17207580.6-1012, dated Aug. 28, 2018.
European Patent Office, Partial European Search Report for related Application No. 18211169.0, dated Sep. 25, 2019.

* cited by examiner

*Primary Examiner* — Melanie Torres Williams
(74) *Attorney, Agent, or Firm* — Brooks Kushman PC

(57) ABSTRACT

A brake caliper and method of manufacture. The brake caliper may have a first portion, a second portion, a first bridge and a second bridge that may be provided as a single casting. A first housing side may have a machined feature that may be axially aligned with a hole in the second portion.

7 Claims, 11 Drawing Sheets

BRAKE CALIPER

TECHNICAL FIELD

The present invention relates to a brake caliper and a method of manufacturing a brake caliper.

SUMMARY

According to an aspect of the present invention there is provided a brake caliper having: a first portion defining a housing adapted to receive an actuating mechanism, a second portion spaced from the first portion thereby defining a plane of rotation of a brake rotor, the second portion defining a first side facing the first portion and a second side facing away from the first portion, a first bridge connecting the first portion to the second portion, and a second bridge spaced from the first bridge and connecting the first portion to the second portion, the first portion, second portion, first bridge and second bridge being cast as a single casting, the second portion having a hole extending through the second portion from the first side to the second side, the housing having a first housing side facing the second portion and a second housing side facing away from the second portion, the first housing side having a machined feature axially aligned with the hole.

The machined feature may be parallel to the plane of rotation of the brake rotor.

The machined feature may be a hole, preferably the hole may be a threaded hole.

The machined feature may define an axially projected area, all of the axially projected area being encompassed by the hole.

The machined feature may be perpendicular to the plane of rotation of the brake rotor.

The machined feature may define an axially projected line, all of the axially projected line being encompassed by the hole.

The machined feature may be flat.

The hole may be formed during a casting process, e.g., the hole may be a cast hole.

According to a further aspect of the present invention there is provided a brake caliper having: a first portion defining a housing adapted to receive an actuating mechanism, a second portion spaced from the first portion thereby defining a plane of rotation of a brake rotor, the second portion defining a first side facing the first portion and a second side facing away from the first portion, a first bridge connecting the first portion to the second portion, and a second bridge spaced from the first bridge and connecting the first portion to the second portion, the first portion, second portion, first bridge and second bridge being cast as a single casting, the housing having a first housing side facing the second portion and a second housing side facing away from the second portion, the first housing side having a machined feature defining an axis, the axis being aligned non-perpendicularly to the plane of rotation of the brake rotor.

The axis of the machined feature may be angled relative to the plane of rotation of the brake rotor by between 89 degrees and 55 degrees.

The first housing side may define a recess for receiving an actuating mechanism, the recess defining a recess opening having a rim.

The machined feature may be in the rim, preferably the machined feature may be a hole, preferably the hole may be a threaded hole.

The machined feature may be in the recess, preferably the machined feature may be a hole, preferably the hole may be suitable for receiving a component having a cylindrical surface, preferably an axis of the cylindrical surface may be parallel to the plane of rotation of a brake rotor.

The machined feature may be flat.

The surface may be concave or convex and/or wherein the surface acts as a bearing surface.

According to a further aspect of the present invention there is provided a method of manufacturing a brake caliper including the steps of: a) casting a brake caliper to provide a bare casting having: a first portion defining a housing adapted to receive an actuating mechanism, a second portion spaced from the first portion thereby defining a plane of rotation of a brake rotor, the second portion defining a first side facing the first portion and a second side facing away from the first portion, a first bridge connecting the first portion to the second portion, and a second bridge spaced from the first bridge and connecting the first portion to the second portion, the housing having a first housing side facing the second portion and a second housing side facing away from the second portion, b) forming a hole in the second portion, the hole extending through the second portion from the first side to the second side, c) machining a part of the housing through the hole to provide a machined feature.

The step of forming the hole may be carried out during a casting process, e.g., the hole may be a cast hole.

According to a further aspect of the present invention there is provided a method of manufacturing a brake caliper including the steps of: a) casting a brake caliper to provide a bare casting having: a first portion defining a housing adapted to receive an actuating mechanism, a second portion spaced from the first portion thereby defining a plane of rotation of a brake rotor, the second portion defining a first side facing the first portion and a second side facing away from the first portion, a first bridge connecting the first portion to the second portion, and a second bridge spaced from the first bridge and connecting the first portion to the second portion, the housing having a first housing side facing the second portion and a second housing side facing away from the second portion, b) providing a machining tool rotatable about a machine tool axis, c) machining a part of the first housing side using the machine tool such that the machine tool axis is non-perpendicular to the plane of rotation of the brake rotor to provide a machined feature.

The method of providing a curved surface in a recess of a brake caliper housing, the method may include: a) carrying out the method of the above mentioned further aspects of the present invention, b) providing the curved surface on a component, c) securing the component to the feature.

The curved surface may define a bearing surface.

BRIEF DESCRIPTION OF THE DRAWINGS

The invention will now be described, by way of example only, with reference to the accompanying drawings in which.

DETAILED DESCRIPTION

Figure 1:
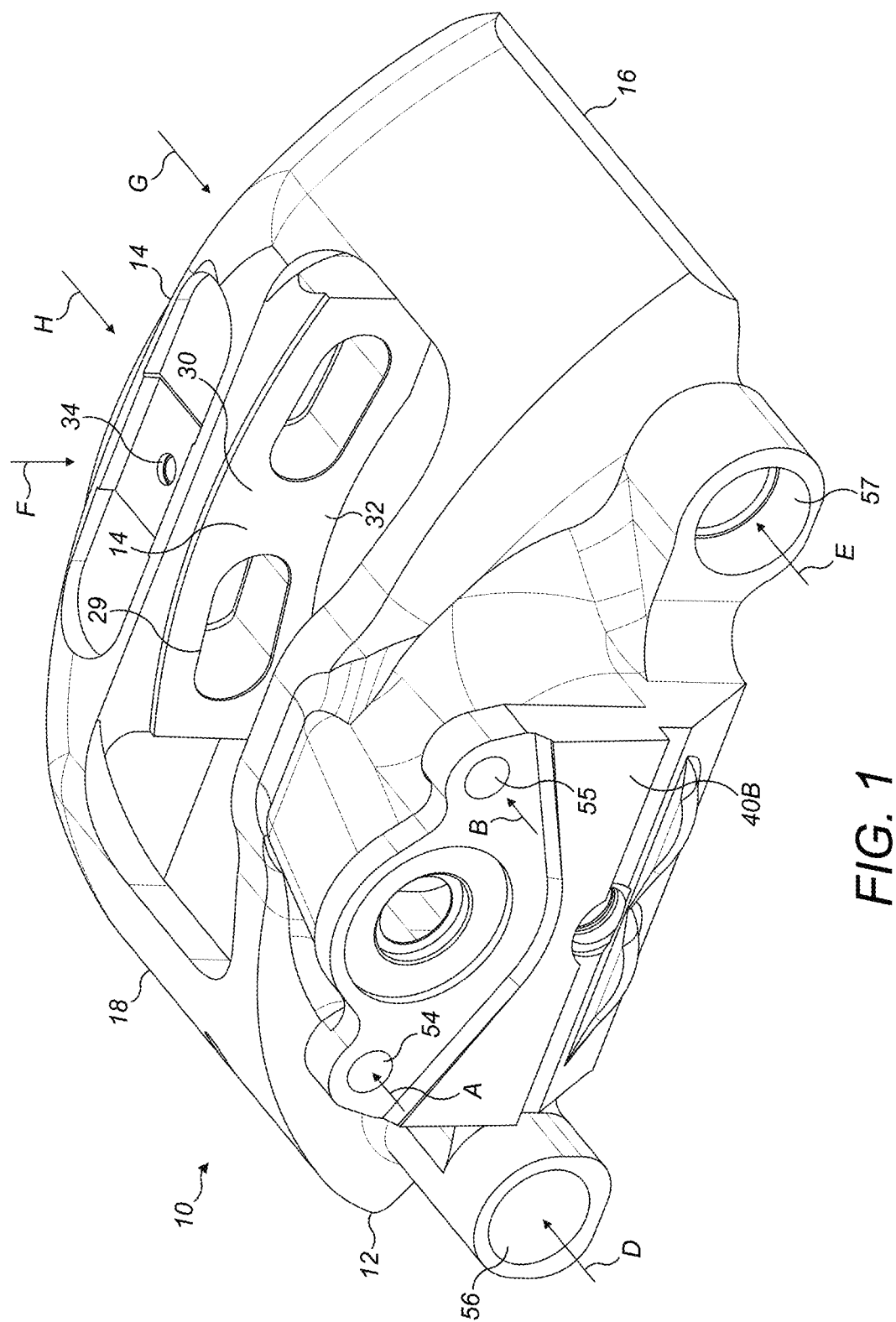
FIG. 1 shows an isometric view of a brake caliper according to the invention.
Figure 2:
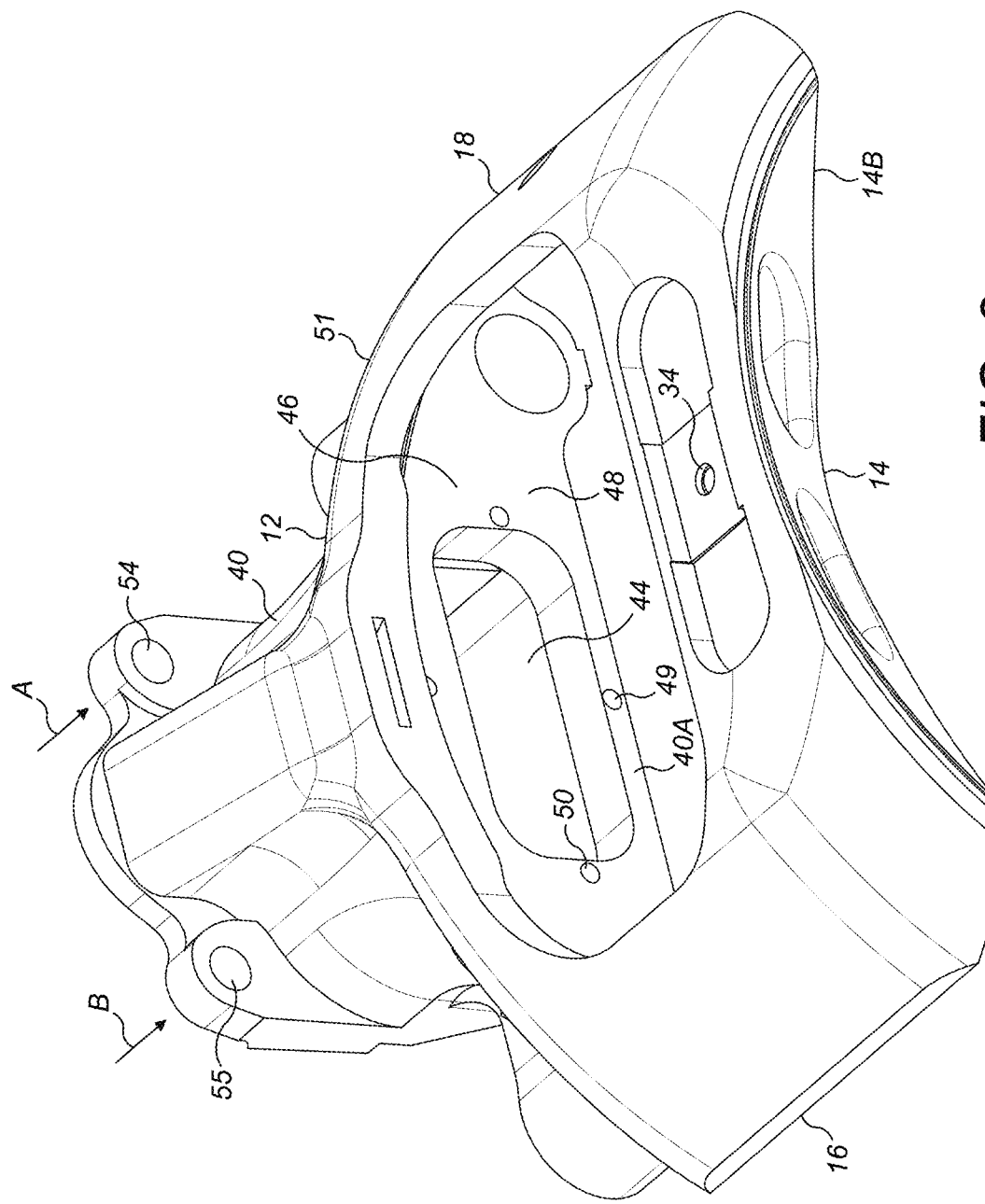
FIG. 2 shows an alternative isometric view of the brake caliper of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 to 6 there is shown a brake caliper (in this case a sliding caliper) 10 having a first portion 12 defining a housing 40 and a second portion 14. The second portion is spaced from the first portion thereby defining a plane P of rotation of a brake rotor 20.

The first portion 12 is connected to the second portion 14 by a first bridge 16 and a second bridge 18. The first bridge 16 is spaced apart from the second bridge 18.

The second portion defines a first side 14A which faces the first portion 12 and a second side 14B which faces away from the first portion 12.

The second portion has a first hole 22 extending through the second portion from the first side 14A to the second side 14B. The first hole 22 defines a wall 22A of the first hole. The second portion 14 also includes a second hole 24 extending through the second portion from the first side to the second side, the second hole defining a wall 24A of the second hole.

Figure 3:
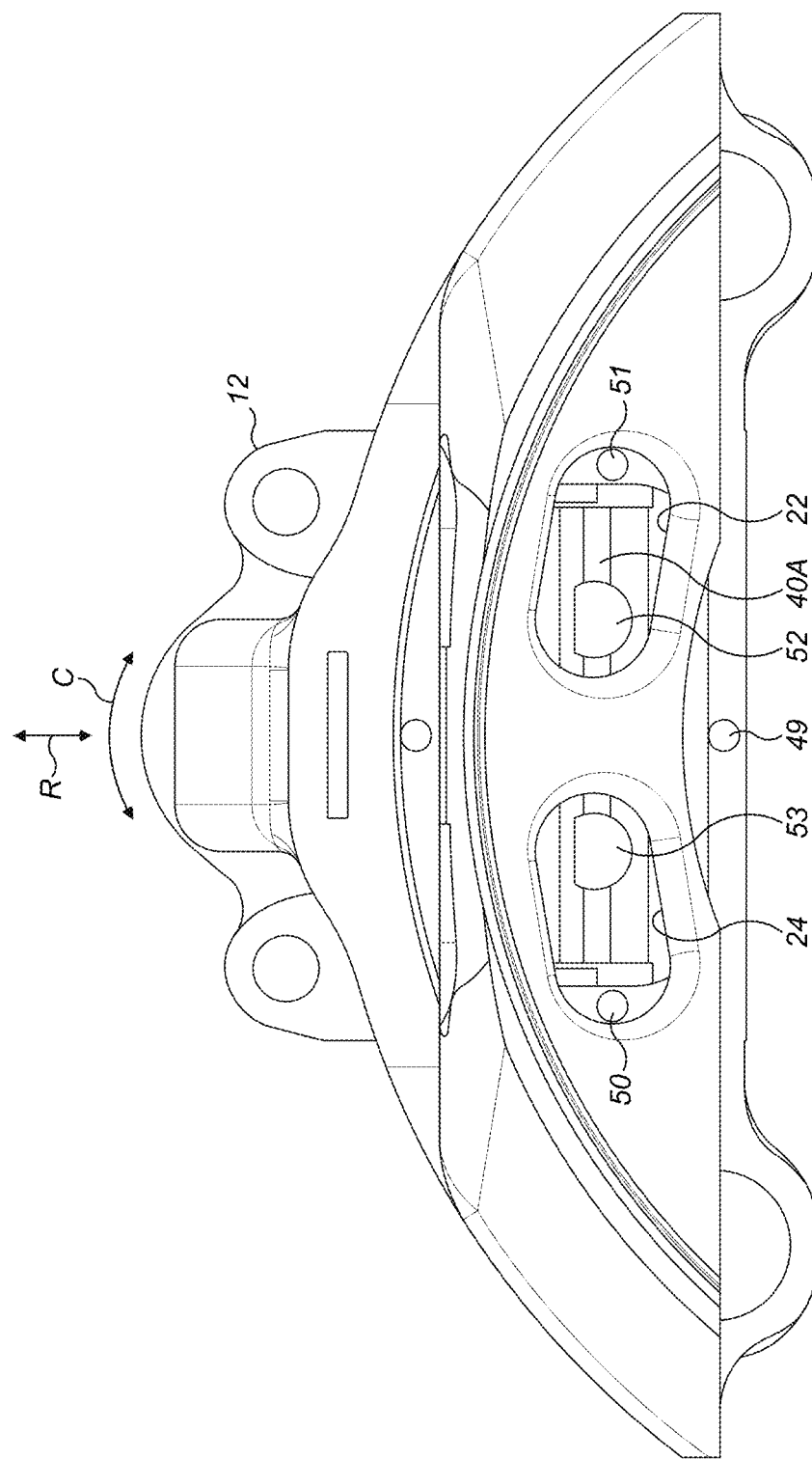
FIG. 3 shows a side view of the brake caliper of FIG. 1.
Figure 4:
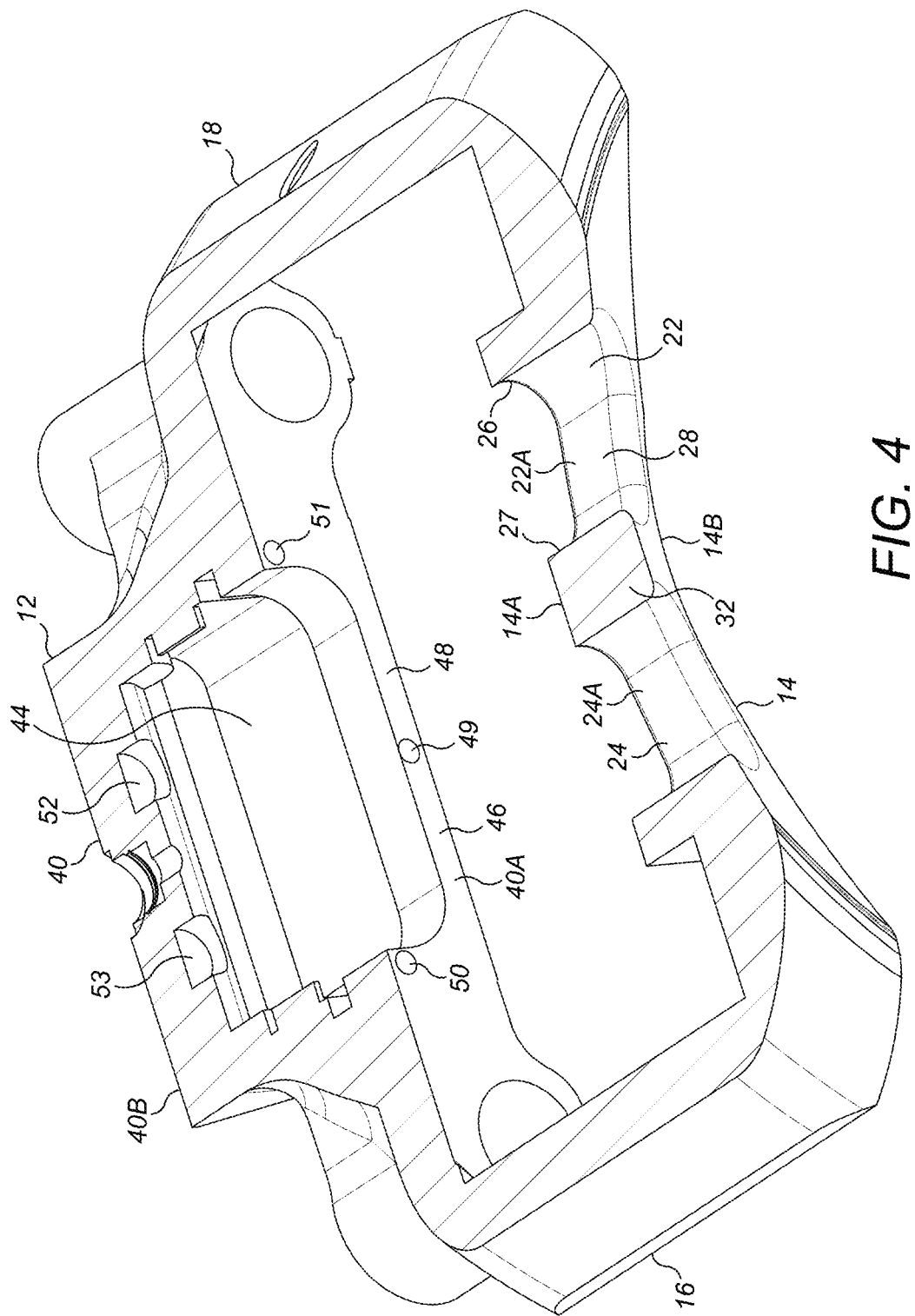
FIG. 4 shows a cross-section isometric view of the brake caliper of FIG. 1.

As will be appreciated the first hole and second hole are both through holes as can be seen from FIGS. 1, 3 and 4. The wall of the first hole therefore is a continuous wall defining the first hole. Similarly, the wall of the second hole is a continuous wall defining the second hole.

Brake caliper 10 defines a radial direction R (see FIG. 3) and a circumferential direction C. As can be seen from FIG. 3 the circumferential extent of the first hole 22 is larger than the radial extent of the first hole. The circumferential ends 26 and 27 of the first hole are curved. The radial edges 28, 29 of the first hole include straight portions.

Similarly, the circumferential ends of the second hole 24 are curved and the radial edges of the second hole 24 include straight portions.

The second portion 14 includes a flat portion 30 which surrounds the first hole 22 and the second hole 24. In use, the brake pad backplate engages the flat portion 30 (as will be further described below). As can be seen from FIG. 5, the flat portion 30 is parallel to the plane P rotation of the brake rotor 20.

The first hole 22 is spaced apart from the second hole 24 by a land 32, Machined into the land 32 is a fixing hole 34, in this case a threaded hole. The threaded hole is used to secure a brake pad retaining strap 36 as will be further described below.

Figure 5:
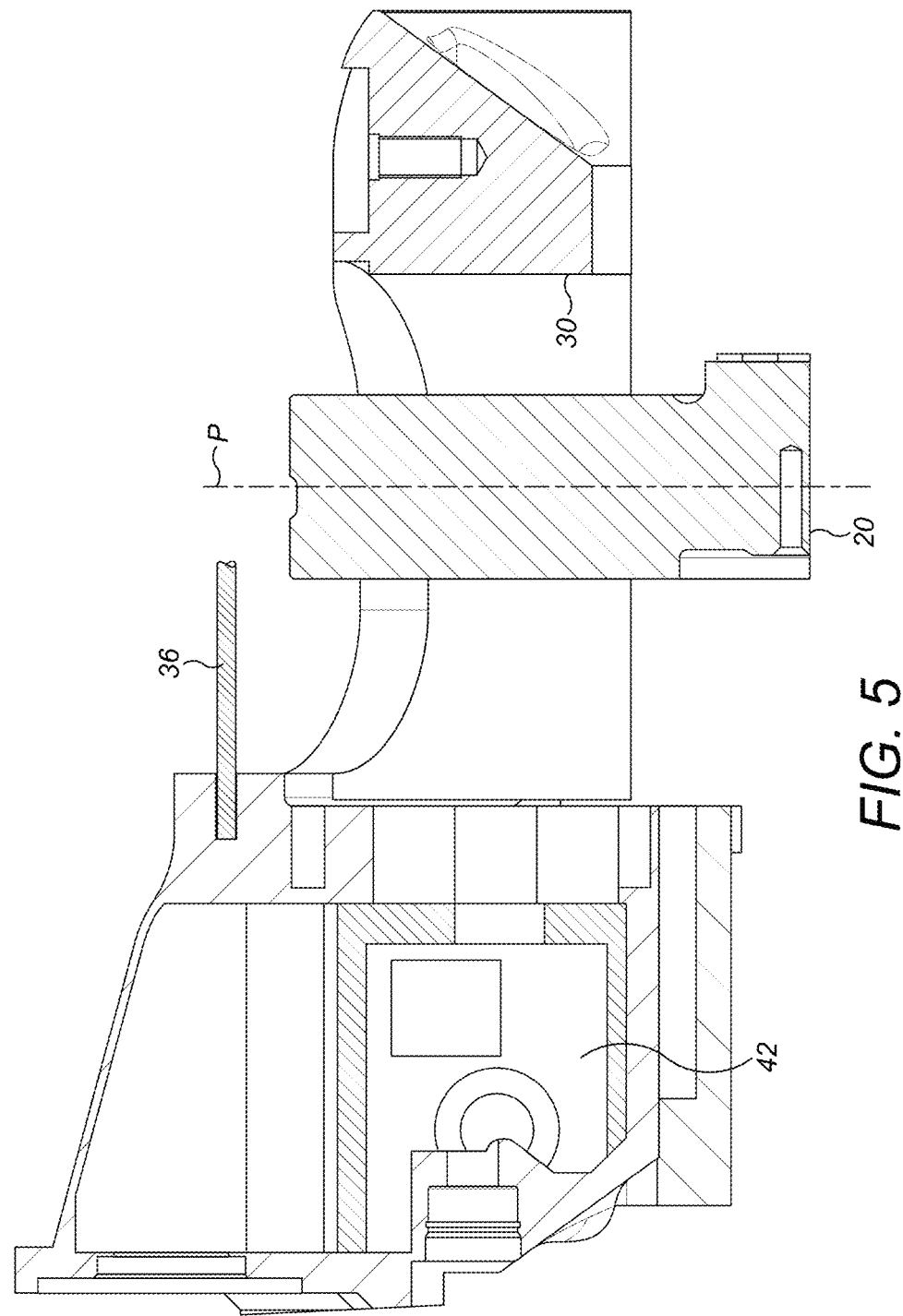
FIG. 5 shows a cross-section of the brake caliper of FIG. 1.

As regards the first portion 12, this defines the housing 40 which is adapted to receive an actuator mechanism 42 (see FIG. 5). The housing has a first housing side 40A facing the second portion 14. The housing has a second housing side 40B facing away from the second portion 14. The first housing side 40A defines a recess 44 for receiving the actuating mechanism 42. The recess defines a recess opening 46 having a rim 48. The rim 48 includes threaded holes 49, 50 and 51. The recess 44 includes machined pockets 52 and 53.

The brake caliper 10 is manufactured as follows.

A mold (not shown) is provided in order to cast the brake caliper. The mold produces a bare casting (i.e., a casting that has not, at this stage, had any machining operations carried out on it). The bare casting includes the first portion, the second portion, the first bridge and the second bridge. Thus, the first portion, the second portion, the first bridge and the second bridge are cast as a single casting.

The mold includes casting cores which define the first hole 22 and the second hole 24 in the bare casting.

Various surfaces of the bare casting are machined. Thus, hole 54 in the first portion 12 is drilled by arranging a drill bit to approach the bare casting in the direction of arrow A in order to machine the casting and hence form the hole 54. Similarly hole 55 can be machined by the drill approaching the casting in the direction of arrow B in order to machine the casting. Hole 56 can be machined by a machine tool approaching the casting in the direction of arrow D, Hole 57 can be machined by a machine tool approaching the casting in the direction of arrow E. Threaded hole 34 can be drilled to a tapping size by a drill approaching the casting in the direction of arrow F and can then be tapped to the correct thread by a tap approaching the hole in the direction of arrow F. As will be appreciated, when machining holes 34, 54, 55, 56 and 57 there is no part of the caliper which obstructs the approach and withdrawal of the machining tool.

In prior art calipers machining certain features within and adjacent a housing which receives an actuating mechanism is complicated since the features are obscured by an outer portion of the brake.

However, in the present application and as best seen in FIG. 3, the machining of threaded holes 50 and 51 and the machining of pockets 52 and 53 is not obscured by the second portion 14 because the second portion 14 includes the first hole 22 and second hole 24 through which the machining tool can pass. Thus, in order to form threaded hole 50, the hole can first be drilled to a tapping size by a drill hit approaching the hole in the direction of arrow G, the drill bit initially passing through second hole 24 as it approaches rim 48 in order to drill the tapping hole. Once the tapping hole has been drilled the drill can be withdrawn back through the second hole. The tap can then approach the hole 50 in the direction of arrow G passing through the second hole 24 as it approaches and taps threaded hole 50. The tap can then be withdrawn from hole 50 and then further withdrawn backwards through the second hole 24.

Threaded hole 51 can similarly be drilled and tapped via tools passing through the first hole 22.

As far pocket 53 is concerned, as best seen from FIG. 4, this can be machined using an end milling cutter with the cutter passing through the second hole in the direction of arrow H in order to mill the pocket and then being withdrawn back through the second hole 24 once milling of the pocket has been completed.

Similarly, a milling cutter can be used to machine pocket 52 by arranging the milling cutter to pass through first hole 22 immediately prior to machining and then being withdrawn back through the first hole after machining.

The base of either pockets 52 or 53 will take the form of the end of the milling cutter and in an embodiment may be flat.

Considering FIG. 3, the thread in threaded hole 50 will have an outer diameter. This outer diameter defines an axially projected area, i.e., when viewing FIG. 3, which is a view taken along the axis of the brake rotor, the threaded hole 50 defines an area of circular shape. In particular, all of this area can be seen through the second hole 24, in other words all of the machined parts of threaded hole 50 when projected in an axial direction are encompassed by the second hole 24. As will be appreciated, the cross-section area of the second hole 24 when viewed in an axial direction is at least as big as the cross section area of the threaded hole 50. In the present case the cross section area of second hole 24 is larger than the cross-section area of the threaded hole 50.

Similarly, the cross-section area of threaded hole 51 when viewed in the direction of FIG. 3, i.e., when viewed in the axial direction of the brake rotor is entirely encompassed by the first hole 22.

As best seen in FIG. 3, the machined pocket 53 has a generally U-shaped shape when viewing FIG. 3, the U-shape defining an axially projected area of the pocket 53. It will be appreciated that this axially projected area is entirely encompassed by cross-section of the second hole 24.

Similarly, pocket 52 has a generally U-shaped cross-section shape defining an axially projected area which axially projected area is entirely encompassed by the cross-section of the first hole 22.

As described above, first side 14A of the second portion has a flat portion 30. This can be machined by a milling cutter attached to a tool positioned in either above the caliper when viewing FIG. 1 or positioned below the caliper when viewing FIG. 1.

Figure 6:
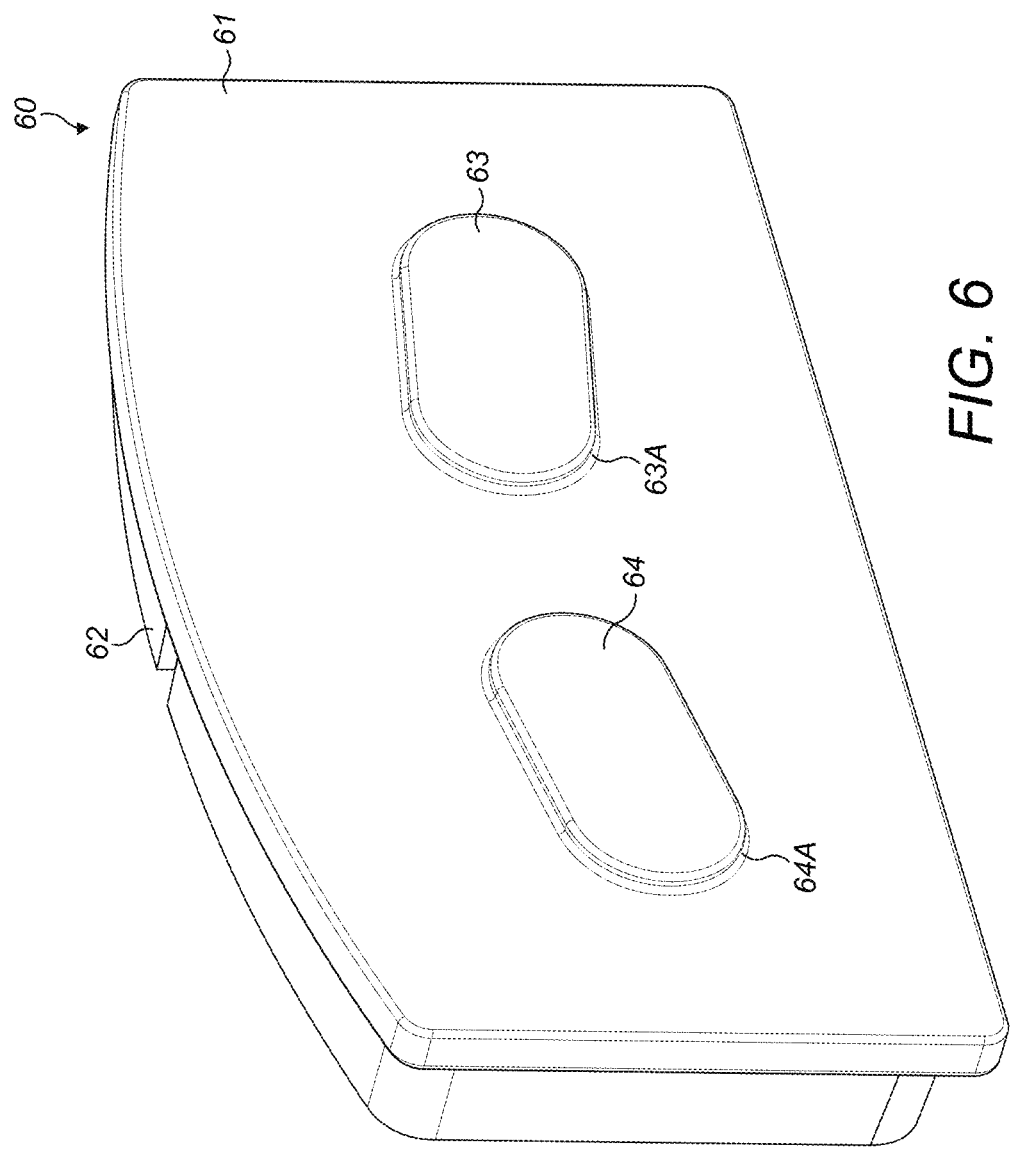
FIG. 6 shows a brake pad for use in the brake caliper of FIG. 1 or FIG. 7.

FIG. 6 shows a brake pad 60 having a brake pad backplate 61 and friction material 62. The brake pad backplate includes first projection 63 and second projection 64. When assembled into the brake caliper 10 the first projection 63 is received in the first hole 22 and the second projection 64 is received in the second hole 24. The first projection 63 includes a rim 63A and the second projection 64 includes a rim 64A, A part of the rim 63A engages part of the wall 22A of the first hole and a part of the rim 64A engages a part of the wall 24A of the second hole. As will be appreciated from FIG. 5, because rims 63A and 64A are received in holes 22 and 24 then this prevents the brake pad 60 moving either up or down in the radial direction R when viewing FIG. 3 and also prevents the brake pad 60 moving right or left in a circumferential direction C when viewing FIG. 3. Furthermore, since the first projection 63 is spaced apart from the second projection 64 then the brake pad cannot twist, i.e., the spacing apart of the first and second projections prevents, for example, the first projection moving radially upwards when viewing FIG. 3 whilst the second projection moves radially downwards when viewing FIG. 3 (and vice versa).

Figure 7:
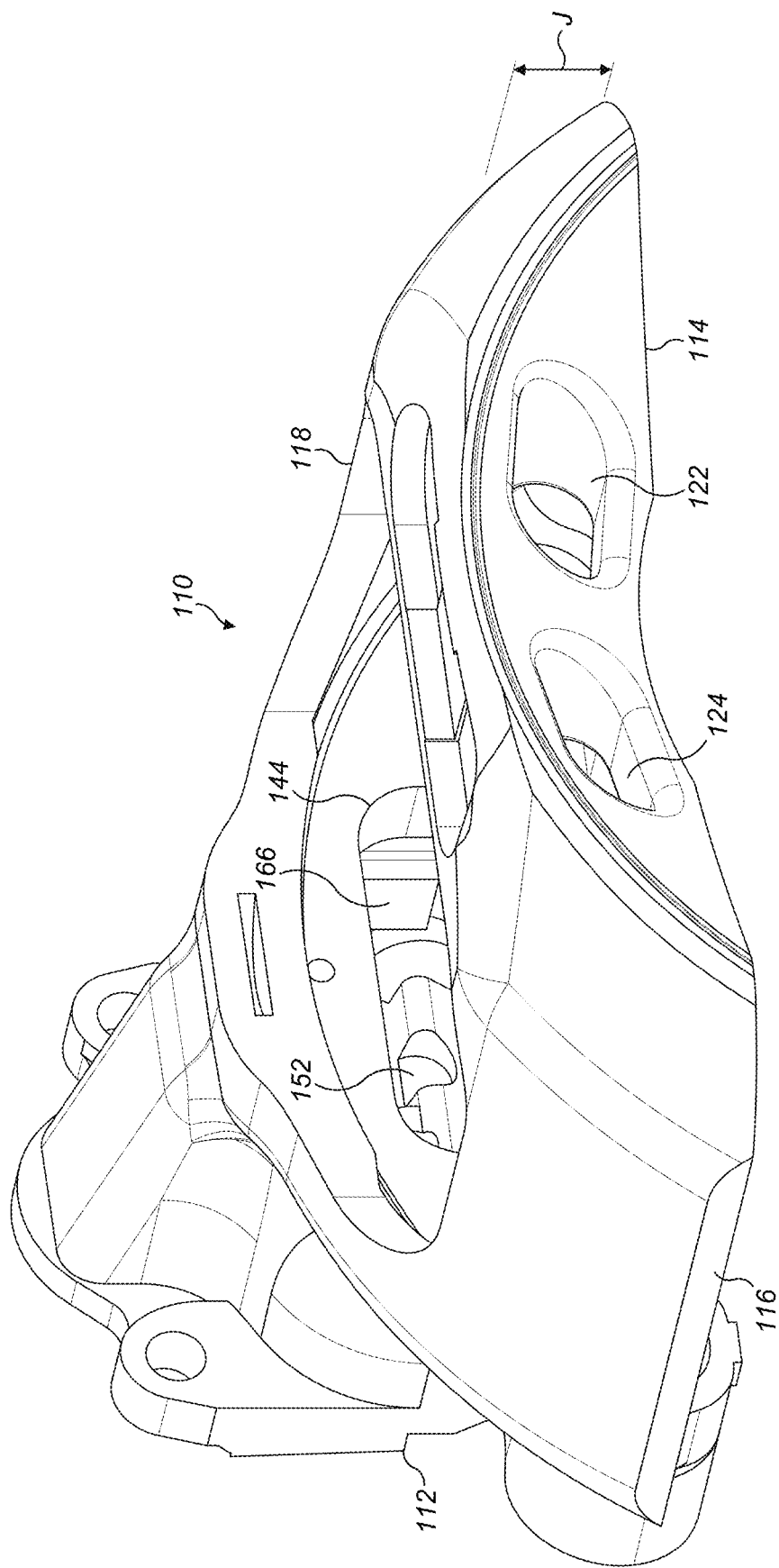
FIG. 7 shows an isometric view of a further embodiment of the brake caliper according to the present invention.
Figure 8:
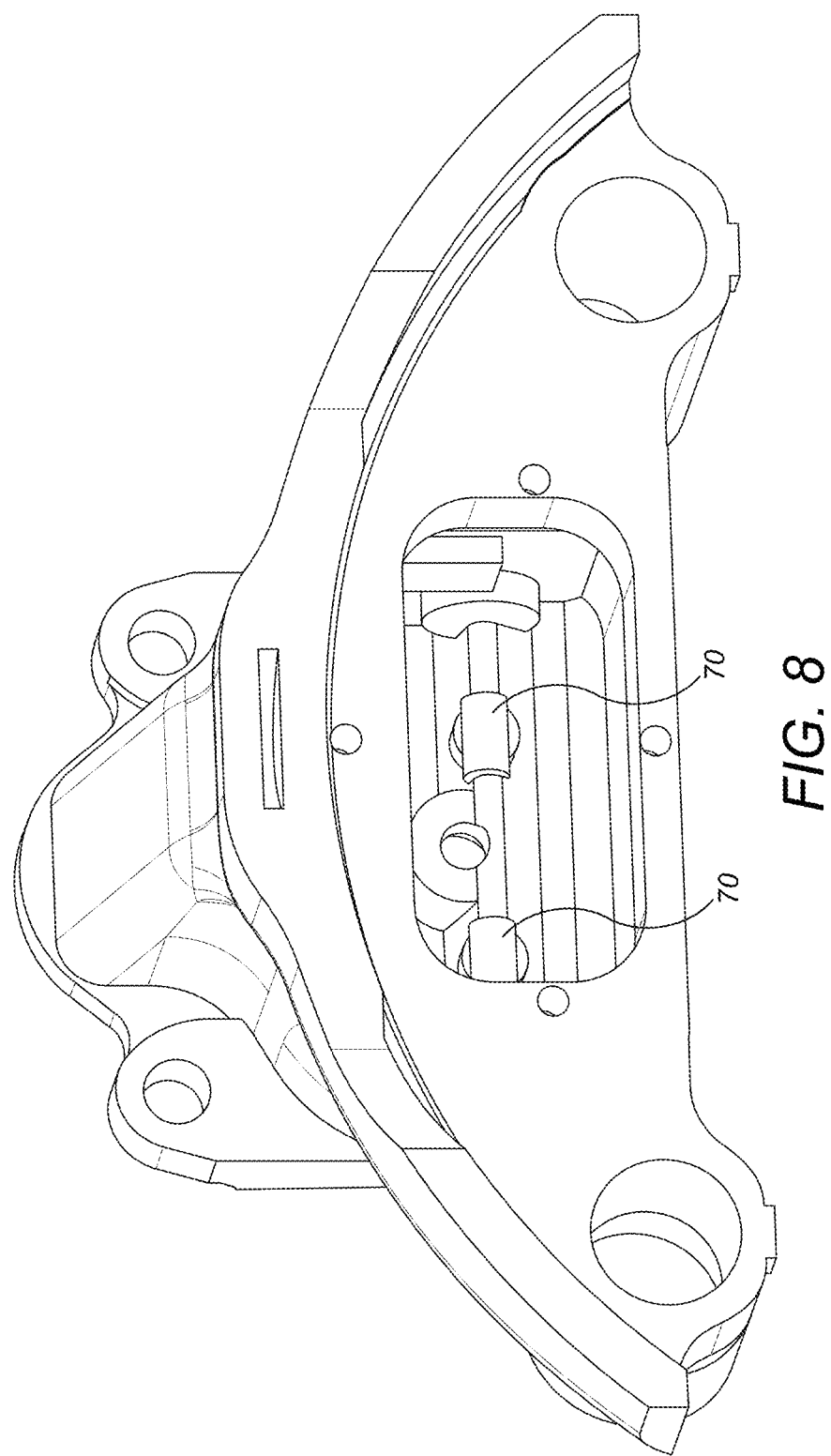
FIG. 8 shows an isometric cross-section view of the brake caliper of FIG. 6.
Figure 9:
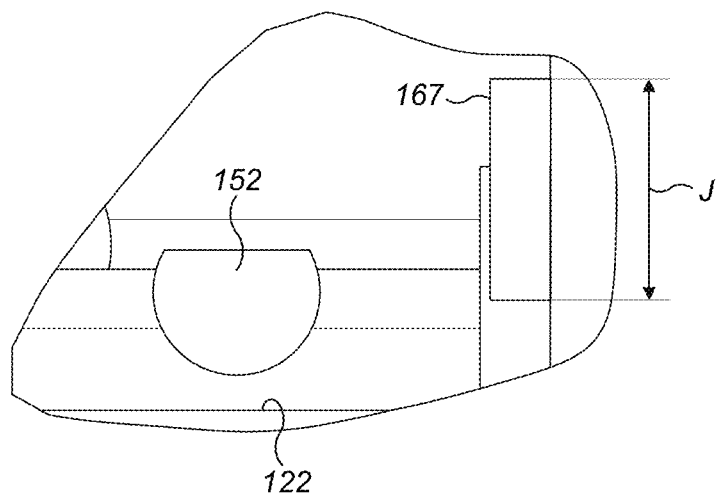
FIG. 9 shows a side view of part of the brake caliper of FIG. 7.

With reference to FIGS. 7 to 9 there is shown a second embodiment of a brake caliper 110 according to the present invention wherein features which perform substantially the same function as those of brake caliper 10 are labelled 100 greater. As will be appreciated, machined pocket 152 is machined in a similar manner to pocket 152, i.e., machined pocket 152 is machined by the tool passing through the first hole 22 as it approaches the pocket and the tool being withdrawn through the first hole 122 once the machining of pocket 152 has been completed (see especially FIG. 9).

In this case the recess 144 includes a machined surface 166, in this case a flat machined surface. As best seen from FIGS. 7 and 9, the machined surface has an overall height J. The machined surface is parallel to the axis of rotation of the brake rotor, in other words it is perpendicular to the plane of rotation of the brake rotor. This machined surface can be machined using a milling cutter which can be moved into position by passing it through the first hole 122 prior to machining and once the machined surface 166 has been completed the milling cutter can be withdrawn back through the first hole 122. As will be appreciated from FIG. 9, the machined surface 166 defines an axially projected line 167 having height J and as best seen in FIG. 9, all of the axially projected line 167 is encompassed by the hole 122.

Figure 10:
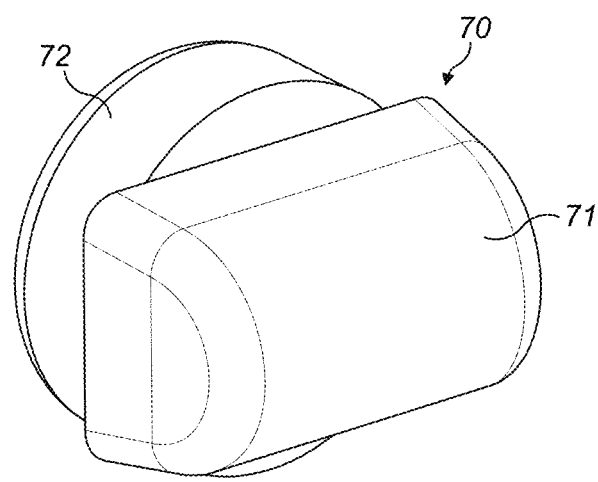
FIG. 10 shows an isometric view of a component for use with the brake calipers of FIGS. 1 and 7.

FIG. 10 shows a bearing 70 having a part cylindrical bearing surface 71 integrally formed with a circular boss 72. The circular boss 72 has a diameter which is similar to the diameter of the machined pocket 152. As can be seen from FIG. 8, once the pocket 152 has been machined, the bearing 70 can be assembled into that pocket, in particular the circular boss 72 can be fitted into pocket 152. This enables the part cylindrical bearing surface 71 to be provided inside the recess 144. As can be seen from FIG. 8, a further bearing 70 can be fitted in a pocket the equivalent of pocket 53 of caliper 10 to provide a second part cylindrical bearing surface. As will be appreciated, with regard to braking caliper 10, a bearing 70 can be fitted into pocket 52 to provide the bearing surface and a further bearing 70 can be fitted into pocket 53 to provide further bearing surface.

Figure 11:
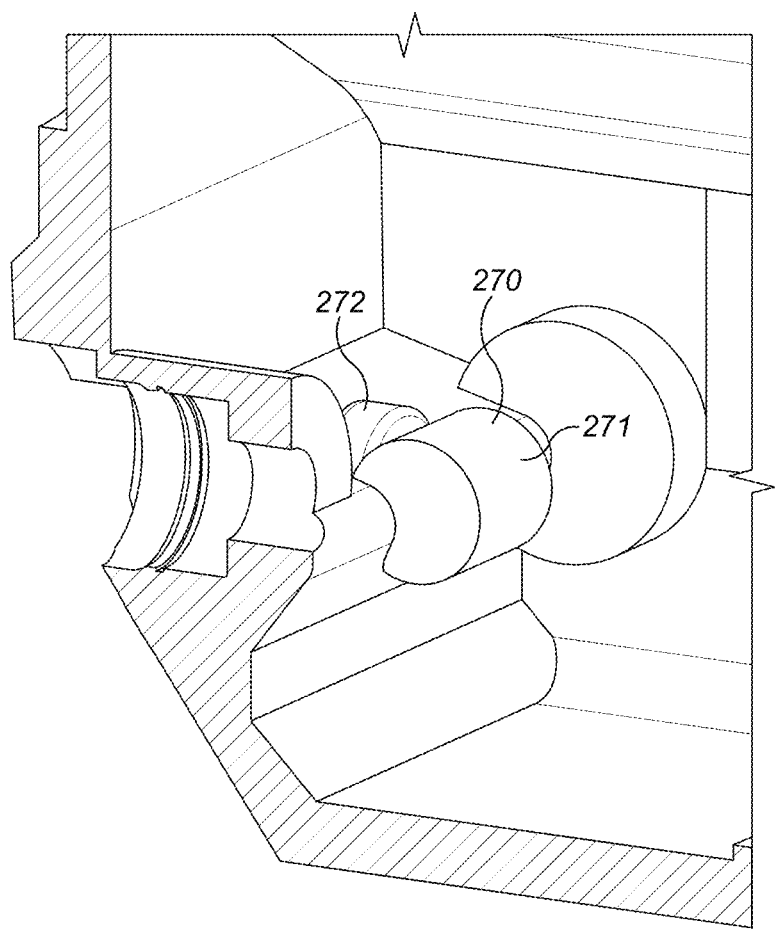
FIG. 11 shows an isometric view of an alternative component for use with the brake calipers of FIGS. 1 and 7.
Figure 12:
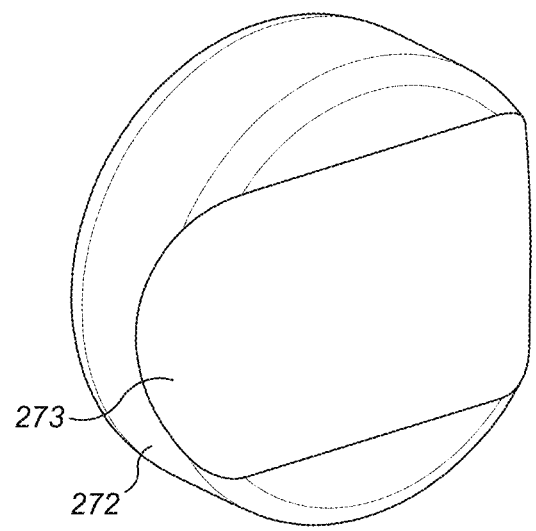
FIG. 12 shows part of the component of FIG. 11A.

The cylindrical bearing surface 71 and the circular boss 72 of bearing 70 are integrally formed. FIGS. 11 and 12 show a bearing 270 wherein a circular boss 272 is formed separately from a cylindrical bearing surface 271. The circular boss 272 includes a concave recess 273 to receive the cylindrical bearing surface 271.

Figure 13:
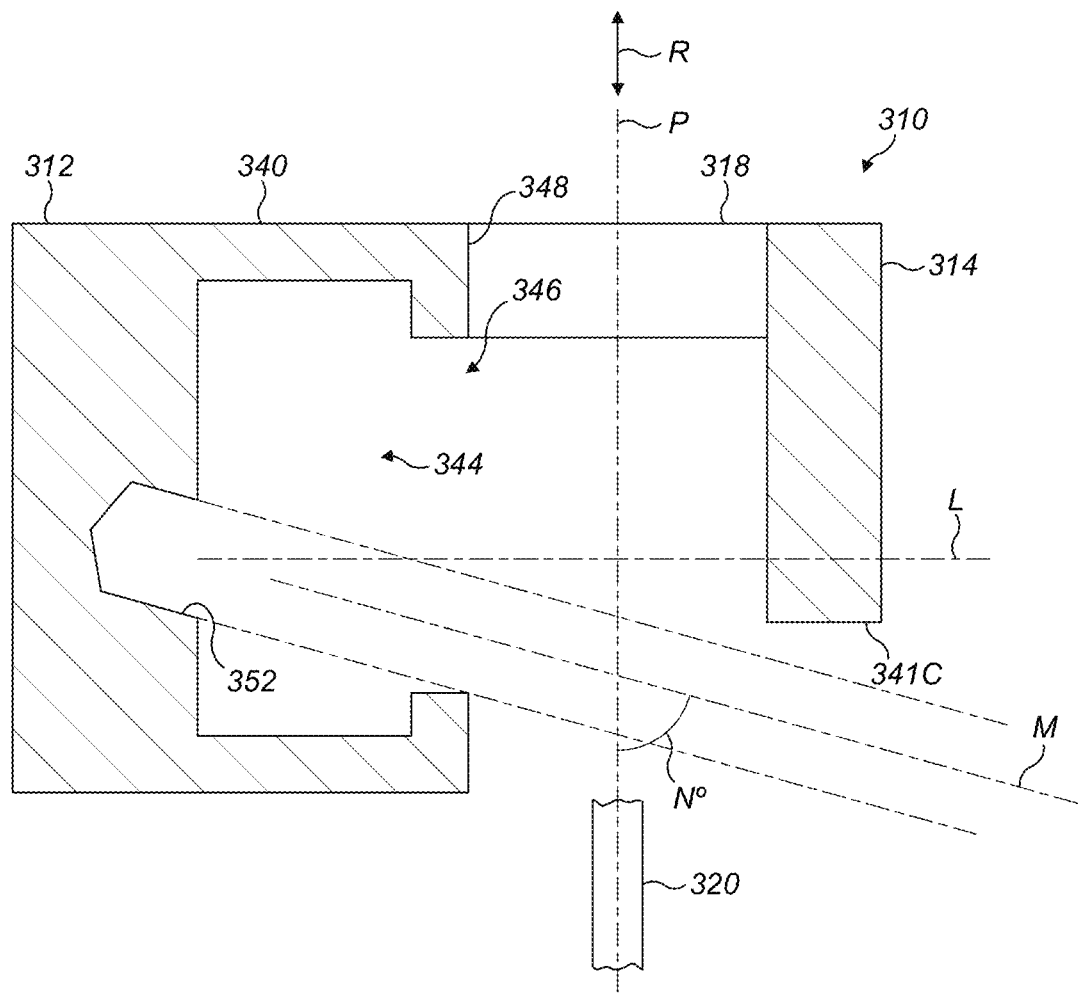
FIG. 13 shows a cross-section view of a further embodiment of a brake caliper according to the invention.

FIG. 13 shows a cross-section view of a brake caliper 310 with components that fulfil the same function as those shown in caliper 10 labelled 300 greater. Plane of rotation P of the brake rotor 320 is shown, as is the radial direction R.

In this case a radially inner portion 341C prevents tool access to machine the pocket 352 in the direction of axis L. In this example there is no hole or the like (equivalent to first hole 22 and second hole 24 of caliper 10) allowing tool access along axis L.

Thus, in order to machine pocket 52 the tool access path M is angled (in this case at angle N) relative to plane of rotation P of the brake rotor 320. Angling of the tool access path M in this manner allows the tool (in this case a drill bit) to machine pockets 52 whilst still allowing clearance between the radially inner portion 341C of the second portion 314 and also allowing clearance between radially inner part of the rim 348.

Once the brake caliper 310 has been finally machined, then a bearing such as bearing 70 or bearing 270 and be assembled into pocket 352 such that the cylindrical bearing surface 71 or 271 lies in the same corresponding position as its assembled position in brake caliper 10 or 110.

Thus, it is not necessary to machine pocket 352 in a direction perpendicular to the plane of rotation P of the brake rotor in order to provide a cylindrical bearing surface for an actuating mechanism (such as actuating mechanism 42) to act on.

As shown in FIG. 13, pocket 352 has been drilled at an angle of N degrees. M further embodiments more than one pocket could be drilled at an angle, for example a pocket corresponding to pocket 53 of brake caliper 10 could also be drilled at an angle. A pocket or other machined surface could be drilled or machined by a tool having an axis at any angle which may be any angle non-perpendicular to the plane of rotation P of the brake rotor. In an embodiment the tool axis (i.e., angle N) may be between less than 90 degrees and 75 degrees to the plane of rotation P of the brake rotor, preferably between less than 90 degrees and 80 degrees to the plane of rotation P of the brake rotor, more preferably between less than 90 degrees and 85 degrees to the plane of rotation of the brake rotor. The machined feature may be a hole and the hole may be a threaded hole. The machined feature may be a flat machined feature such as machined surface 166 of brake caliper 110. The machined feature may be within a recess of the housing or may be outside of the recess of the housing. The machined feature may be in a rim of the housing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake caliper comprising:
    a first portion defining a housing adapted to receive an actuating mechanism;
    a second portion spaced from the first portion thereby defining a plane of rotation of a brake rotor, the second portion defining a first side facing the first portion and a second side facing away from the first portion;
    a first bridge connecting the first portion to the second portion; and
    a second bridge spaced from the first bridge and connecting the first portion to the second portion
    the first portion, second portion, first bridge and second bridge being cast as a single casting;
    the second portion having a hole extending through the second portion from the first side to the second side;
    the housing having a first housing side facing the second portion and a second housing side facing away from the second portion; and
    the first housing side having a machined feature that is axially aligned with the hole, wherein the machined feature defines a cross sectional area, and a cross sectional area of the hole in the second portion is larger than the cross sectional area of the machined feature.

2. The brake caliper of claim 1 wherein the machined feature is parallel to the plane of rotation of the brake rotor.

3. The brake caliper of claim 1 wherein the machined feature is perpendicular to the plane of rotation of the brake rotor.

4. A method of manufacturing a brake caliper comprising the steps of:
    a) casting the brake caliper to provide a bare casting having:
        a first portion defining a housing adapted to receive an actuating mechanism;
        a second portion spaced from the first portion thereby defining a plane of rotation of a brake rotor;
        the second portion defining a first side facing the first portion and a second side facing away from the first portion;
        a first bridge connecting the first portion to the second portion; and
        a second bridge spaced from the first bridge and connecting the first portion to the second portion; and
        the housing having a first housing side facing the second portion and a second housing side facing away from the second portion;
    b) forming a hole in the second portion, the hole extending through the second portion from the first side to the second side; and
    c) machining a part of the housing through the hole to provide a machined feature, wherein the machined feature defines a cross sectional area, and a cross sectional area of the hole in the second portion is larger than the cross sectional area of the machined feature.

5. The method of claim 4 further comprising providing a curved surface on a component and securing the component to the machined feature.

6. The method of claim 4 wherein machining the part of the housing includes inserting a milling cutter through the hole in the second portion to reach the housing, machining the machined feature with the milling cutter, and then withdrawing the milling cutter back through the hole.

7. The method of claim 6 wherein the machined feature includes a flat surface that is parallel to an axis of rotation of the brake rotor.

* * * * *